May 7, 1946.  R. C. SCHOCK  2,399,710
MASH AND WORT SEPARATOR AND METHOD IN SEPARATING WORT FROM MASH
Filed March 2, 1944
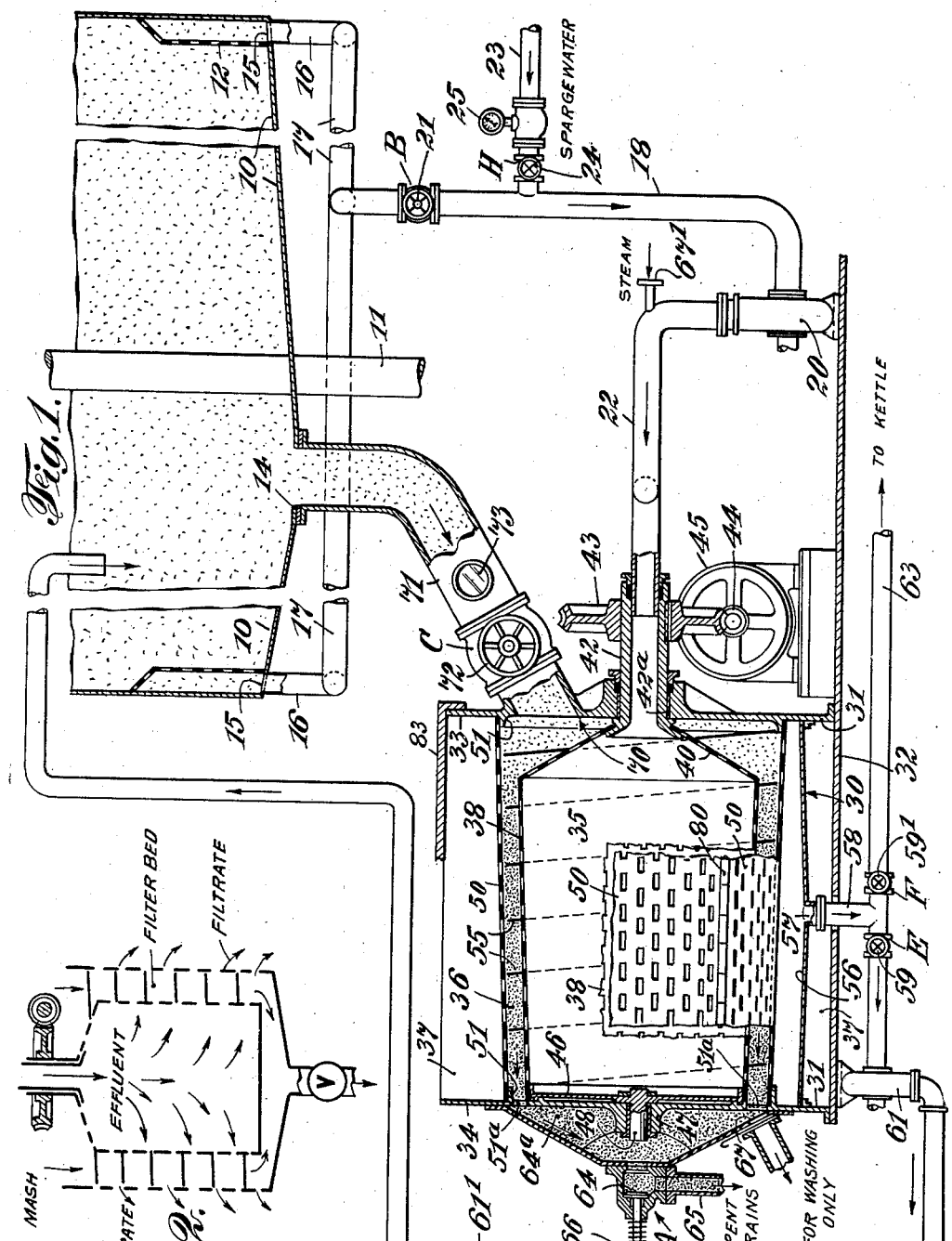
INVENTOR
Robert C. Schock
BY C. P. Goepel
his ATTORNEY Patented May 7, 1946

2,399,710

UNITED STATES PATENT OFFICE 2,399,710

MASH AND WORT SEPARATOR AND METHOD IN SEPARATING WORT FROM MASH

Robert C. Schock, New Rochelle, N. Y., assignor to Schock, Gusmer & Co. Inc., Hoboken, N. J., a corporation of New Jersey Application March 2, 1944, Serial No. 524,763

3 Claims. (Cl. 210—194)

This invention relates to mash and wort separators, and has for its object to provide a continuously revolving separator, and a novel method of treating the mash during its leaching for removing the wort from the mash, leaving the spent grains.

It is known to discharge the mesh with wort from the mash tank and subject it to a filtering operation; these operations are of various kinds, but have not given complete satisfaction.

The novel method consists in subjecting continuously a continuous supply of mash to an agitating and compressing action, during the travel of such mash, and simultaneously subjecting said mash to a diffusing effluent in continuous flow through the mash, whereby the entire supply of mash is leached, successive supplies of mash being likewise subjected, while under agitation, to the continuously moving effluent.

The novel mash separator consists of a perforated revolving drum, a slotted cylinder surrounding the same and forming with the exterior of the drum a mash receiving compartment, means in said compartment for agitating mash from one end to the other, and means for supplying an effluent to continuously pass through the mash in said compartment, with the necessary supply and discharge means for the spent mash and filtrate.

The novel method and features of construction of the separator, forming part of the invention will be more fully described hereinafter, shown in the drawing, and finally pointed out in the claims.

In the accompany drawing,

Fig. 1 is a vertical central section of a fragmentary portion of the mash tank or tub, and the improved separator embodying this invention disposed below the same, and Fig. 2 is a diagrammatic drawing showing the operation of the method.

Referring to the drawing, the bottom 10 of the mash tub or tank has as shown, a central shaft 11. This shaft supports masher arms which are rotated and as such construction is well known it is not shown.

Circumferentially disposed to the tub is a wall 12 perforated to allow the passage of wort. The bottom 10 of the tank is provided with a discharge opening 14 and with a pair of diametrically opposite openings 15, communicating with downwardly depending conduits 16. These conduits 16 are joined by a connecting conduit 17, communicating with a downwardly extending conduit 18, and this conduit 18 leads to a circulating pump 20. The fluid in the conduit 18 is controlled by valve B of suitable construction having preferably a handwheel 21.

A conduit 23 leads to a sparge water supply (not shown) and may be connected with the conduit 18, or with the circulating pump 20, in suitable relationship thereto. The sparge water conduit 23 is provided with a valve H of suitable construction, preferably controlled by a handwheel 24. A gauge 25 indicates the pressure of the sparge water.

The pump 20 discharges into a conduit 22 connected with the improved separator.

The separator consists of a casing 30, supported by legs 31 upon the foundation 32. One end wall 33 of the casing 30 has the inlet devices for the effluent and mash and the opposite end 34 has outlet devices for the spent mash or spent grains. The filtrate gathers at the bottom of the casing to be discharged therefrom.

The casing 30 is divided into three circumferentially disposed substantially co-axial compartments, the central or effluent compartment 35, the intermediate or mash compartment 36 and the outer or filtrate compartment 37.

The central or effluent compartment 35 is formed by the hollow interior of a conical revolving drum having a conical inlet portion 40, both having perforations throughout their area. This portion 40 is secured to a hollow trunnion 42 supported by bearings 42a in the inlet end wall 33 of the casing 30, to which trunnion 42 a worm gear 43 is secured, rotated by a worm 44 driven preferably by an electric motor 45, suitably supported on the foundation 32. The opposite end wall 46 of the drum 38 is not perforated and is spaced from an adjacent end wall 34 of the casing 30, which is provided with a trunnion bearing 47 supporting the trunnion 48 secured to the end wall 46 of the drum 38.

Concentric with the perforated drum 38 is a stationary enclosing wall 50, substantially cylindrical which inclines towards the outlet end 34 of the casing 30, and which has its ends secured to the interior sides of the walls 33 and 34 of the casing 30 as shown at 51. The wall 50 is spaced from the drum 38 to form a hollow cylindrical compartment and this is the intermediate or mash compartment 36 before referred to. The wall 50 is provided with outlet slots of elongated form throughout its area. The outlet end wall 34 is provided with suitable openings 51a for the passage of the spent mash or grains into the outlet chamber 64a communicating with the valve 64.

Upon the exterior of the drum 38 there is secured in a suitable manner, a spirally disposed plate forming a screw 55, and the width or depth of this plate is about equal to the space between the exterior of the drum 38 and the interior of the wall 50, the pitch of the screw 55 preferably increasing from the outlet end to the inlet end.

The outer or filtrate compartment 37 is formed by the space between the exterior side of the wall 50 and the interior side of the casing 30. The lower portion of the casing 30 is provided with a flaring bottom 56, discharging the filtrate at 57 into a conduit 58 of inverted T shape, both legs being valved by valves E and F. The valve E with the aid of an operating handwheel 59 controls the flow to a pump 61 known as a vorlauf pump which pumps the flow back to the mash tub by a pipe 61¹. The other valve F, also with the aid of an operating handle 59¹, controls the flow of the filtrate to the conduit 63 leading to the kettle (not shown).

The end wall 34 of the casing 30 has a valve controlled outlet 64 with a discharge conduit 65 for the spent grains. The valve operated by its operating handle 66 controls the back pressure against the mash in the mash compartment 36. A slide valve controlled opening 67 is used for cleaning purposes, as also a steam connection 67¹ in the conduit 22.

Finally, the inlet end wall 33 of the casing 30, has a circular opening 70, which provides communication between the mash compartment 36 and a conduit 71, controlled by a valve C, having an operating handle 72, and a sight glass 73, which conduit 71 leads directly to the discharge opening 14 in the bottom of the mash tub 10.

The slotted wall 50 may be provided with hinges 80 of the general piano type longitudinally along each side, and the upper segments each about two thirds of each side, may be moved outwardly. Such a construction facilitates entrance into the mash compartment formed by the drum and slotted wall, and is advantageous in the cleaning of the same. A cover 83 may be provided for the casing.

The operation of the separator described is as follows:

As a preliminary action, with valves, A, B and C closed, valve C is opened, and the mash enters the compartment 36. The motor 44 is started to rotate the drum and its screw, whereby the intermediate compartment 36 becomes filled with mash, which latter status will be visible through the sight glass 73. The screw 55 continually moves the incoming mash from the inlet end to the outlet end, compressing it tighter and tighter, but not too tight, as this mash is used to form a filter bed. The motor is then stopped and at the same time the valve C is closed to interrupt the supply of the mash. Valve B is now opened and the wort from the false bottom of the tub, descends in conduit 18 and is pumped by pump 20 through conduit 22 into the compartment 36. The wort passes through the filter bed, enriching the same, and the clarified excess then discharges to the pipe 57 and with valve E opened and valve F closed, passes to the vorlauf pump, and is pumped back to the mash tub. This wort is relatively rich. When the wort is clear, valve E is closed. Then valve B is closed, and valve C again opened. The motor 44 is started if stopped, and the drum caused to revolve at a low speed and the new supply of mash is supplied to the mash compartment. During this time, valve H is opened to supply sparge water in quantities as needed and timed, which is determined by the amount of sparge water which for a given gallon per minute will extract the desired wort from the wet grain or mash acting as the filter bed. Valve A is opened to permit a continuous mash supply.

In other words, mash enters from valve C to form a filter bed corresponding to the depth of the intermediate or mash compartment and the valve C is then closed. The first wort which is not clear is clarified by leaching it through the filter bed, it entering from valve B, valve C being closed, by seeping through the bed, which bed retains some of the first wort. The excess first wort passes to the flaring bottom 56 and as stated back to the tank. This preliminary action having been completed, the valve B is closed, and the valve C is again opened and valve A is opened, and sparge water enters from the open valve H, and passes through the filter bed from the central compartment and leaches out the retained first wort in the filter bed and then the wort of the succeeding mash which continuously enters the mash compartment and as a filter bed moves from its inlet to its outlet. The spent grains of the filter bed mash, that is, the mash deprived of any adhering wort, are discharged at 65. The entire mash is leached during the agitation of the filter bed as the drum with its spiral or screw is in motion during this leaching. The sparge water effluent passing outwardly through the filter bed extracts any sugar from the mash and becomes an enriched filtrate which is discharged at 57 and, with valve F open, directed to the kettle. Thus the mash is subjected to such a compressing action as to form a filter bed, which is used first to clarify the wort and then to have separated therefrom any adhering wort by the action on the filter bed of a continuous supply of sparge water acting on a continuous new supply of mash.

The method which may be carried out independently of the apparatus shown and described, consists in subjecting mash from the mash tank to a continuous rotation and agitating movement travelling continuously so as to be capable of being successively subjected to an effluent under a diffusing action. An effluent is continuously supplied to the agitating successive increments of the mash. The effluent continuously passes through the mash while the latter moves at low speed, and continually discharges from the mash in the form of a filtrate which contains the leached out material from the mash, the movement of the mash and its compression and its agitation, and flow of the effluent being regulated to enable the leaching to be carried out to the desired amount under maintenance of a diffusion action. In contrast to high speed centrifugals, this rotation of the filter bed and its simultaneous successive increment movement is at a low speed. The action is a continuous and simultaneous one. The flow of the effluent is not forced to enable it to diffuse with the mash of the filter bed. The diffusion of the effluent in between the constantly moving grains of the mash, enables the effluent to dissolve any wort adhering to the grains of the mash or such as is entrained in the cell structure of the grains, and carry the leached out substances away from the mash filter bed.

In Fig. 2 is shown diagrammatically the mode of operation of the method. The effluent descends vertically and moves radially outwards without current flow but under diffusion action through a rotating filter bed which is under agitation and subjected to a progressive movement until leached when it is discharged by the lowermost valve. Thus, the mash enters continually, is moved along during slow speed rotation, and the effluent passes through it in a continuous diffusing stream, the filtrate being also continually discharged. The improved result is that always a fresh supply of effluent continually and gently impinges upon the grains of the mash at different parts of the grains, the agitated grains presenting different facets to the effluent, so that a thorough washing or leaching is achieved. The relatively slow speed of movement of the mash and the gentle flow of the effluent provides the best condition for such varied impingement.

I have described a method and an apparatus, but changes may be made therein within the scope of the invention as defined in the claims.

What I claim is:

1. In a mash and wort separator, a hollow cylindrically shaped drum, with all over distributed openings, forming an interior compartment, a stationary cylindrically shaped wall, with all over distributed openings, surrounding the drum and concentrically spaced from the drum sufficient to form with the exterior of the drum a filter bed compartment of relatively small radial depth compared with the diameter of the drum, inlet means for supplying mash to one end of the filter bed compartment, blades forming a spiral on the exterior of the drum extending to the stationary wall for moving and continuously advancing said filter bed from said inlet means to its discharge longitudinally through the filter bed compartment, means for rotating the drum with the blades, inlet means, of smaller diameter than that of the drum, axially disposed at one end of the drum for supplying an effluent to the interior of the drum for forming an effluent mass within the drum, and means exterior to the stationary wall for collecting the effluent discharged therethrough, whereby said mass passes radially out of the openings of the drum, through the filter bed, and through the stationary wall, to leach by diffusion action the filter bed, during its movement from the inlet to the discharge in the filter bed.

2. In combination with a mash tub, of a hollow conical, substantially cylindrical, rotatable drum for receiving mash from the mash tub on its exterior at its larger diameter, a hollow conical, substantially cylindrical, surrounding stationary shell spaced from the exterior of the drum to form with the drum a filter bed compartment of small radial depth compared to the diameter of the drum, the drum and the shell having openings in all over distribution, mash supply means for supplying mash from the tub to said compartment, an axially disposed effluent inlet of small diameter compared to the smaller diameter of the drum, means for supplying an effluent from the tub to said inlet, for passing the mass of effluent in the drum from the interior of the drum in diffusion action through the filter bed on the drum in continuous supply, during the continuous supply of the mash to the compartment a spent mash discharge for the filter bed at the smaller diameter of the drum independent and separate from the exterior of the shell, and collecting means at the exterior of the shell for the effluent discharged from the shell.

3. The method of separating wort from mash discharged from the mash tub, which consists in subjecting such mash distributed in a substantially cylindrical hollow filter bed body having a small radial depth compared to the diameter of the body to a continuous low speed increment axial movement, and simultaneously subjecting the interior bore of said filter bed body to a mass of wort solvent for passing said solvent by diffusion action radially through the filter bed body from its interior to its larger diameter exterior, to leach the circumferentially spaced mash and form a filtrate of the wort and sugar of the mash, by the different facets of the grains of the mash being acted upon by said wort solvent during the circumferentially disposed spatial distribution of the mash under said diffusion action.

ROBERT C. SCHOCK.